(12) United States Patent
Kim

(10) Patent No.: US 7,173,904 B1
(45) Date of Patent: Feb. 6, 2007

(54) SYSTEM AND METHOD FOR REVERSE LINK OVERLOAD CONTROL

(75) Inventor: Kyoung Kim, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/401,326

(22) Filed: Sep. 23, 1999

(51) Int. Cl.
*H04Q 7/20* (2006.01)
*H04Q 7/38* (2006.01)
*H04B 7/00* (2006.01)

(52) U.S. Cl. .................. 370/230; 370/252; 370/329; 370/395.2; 455/452.1; 455/453; 455/522; 455/67.11

(58) Field of Classification Search ............... 370/320, 370/335, 342, 441, 230, 235, 252, 253, 331, 370/332, 389, 395.1, 395.2, 329; 445/67.1, 445/423, 450, 452.1, 452.2, 453, 522, 67.11
See application file for complete search history.

(56) References Cited

U.S. PATENT DOCUMENTS

| | | | |
|---|---|---|---|
| 4,984,264 A * | 1/1991 | Katsube | |
| 5,347,511 A * | 9/1994 | Gun | |
| 5,838,671 A * | 11/1998 | Ishikawa et al. | 370/335 |
| 5,886,988 A | 3/1999 | Yun et al. | |
| 6,192,031 B1 * | 2/2001 | Reeder et al. | 370/230 |
| 6,192,249 B1 * | 2/2001 | Padovani | 455/453 |
| 6,216,006 B1 * | 4/2001 | Scholefield et al. | 455/450 |
| 6,415,153 B1 * | 7/2002 | Liew | |
| 6,553,233 B1 * | 4/2003 | Lee et al. | 455/446 |
| 6,603,745 B1 * | 8/2003 | Antonio et al. | 370/318 |
| 6,643,521 B1 * | 11/2003 | Bourgoin et al. | 455/522 |
| 6,671,512 B2 * | 12/2003 | Laakso | 455/453 |
| 6,832,255 B1 * | 12/2004 | Rumsewicz et al. | 709/227 |
| 6,987,729 B1 * | 1/2006 | Gopalakrishnan et al. | 370/230 |

FOREIGN PATENT DOCUMENTS

| | | |
|---|---|---|
| WO | 9535637 | 12/1995 |
| WO | 9713334 | 4/1997 |
| WO | 9824199 | 6/1998 |
| WO | 9923842 | 5/1999 |
| WO | 0025548 | 5/2000 |

OTHER PUBLICATIONS

R. Padovani, "Reserve Link Performance of IS-95 Based Cellular Systems", *IEEE Personal Communications*, pp. 28-34, 1994.
Huang, Ching Yao, "Call Admission in Power Controlled CDMA Systems", IEEE, vol. 3, May 1996, New York, pp. 1665-1669.

* cited by examiner

*Primary Examiner*—Alpus H. Hsu

(57) ABSTRACT

A system and method for controlling call admission in a wireless communications network recursively estimates reverse link load levels as a function of changes in base station receive power and/or the number of mobiles served in the cell/sector. In one implementation, a call admission controller utilizes multiple load level estimating methods, whereby a first method estimates load as a function of changes in base station receive power and changes in the number of served mobiles. The call admission controller uses a second method to recursively update load level estimates as proportionally changing with number of users. The call admission controller may utilize a third estimate method as an accuracy check based on a changes in base station receive power measurements. The call admission controller outputs a call blocking command when load level estimates exceed a threshold to avoid cell/sector overload conditions and network instability.

21 Claims, 2 Drawing Sheets

SYSTEM AND METHOD FOR REVERSE LINK OVERLOAD CONTROL

BACKGROUND OF THE INVENTION

1. Field of the Invention

The present invention relates to the field of wireless communications.

2. Description of Related Art

In contrast to Time Division Multiple Access (TDMA) and Frequency Division Multiple-access (FDMA) techniques, which create multiple communication channels from a single radio frequency (RF) bandwidth by assigning different time slots to mobile subscriber terminals ("mobiles") and subdividing an RF band into a plurality of sub-bands respectively, systems which are based on spread spectrum techniques, such as Code Division Multiple Access (CDMA) systems, exhibit "soft capacity" by using orthogonal code sequences to differentiate mobiles. In other words, the number of mobiles that a single cell/sector of a CDMA system can support at one time is not fixed, and instead is generally limited only by the degradation of service quality caused by interference from other mobiles in the same or adjacent cells/sectors.

To address this tradeoff between network capacity and service quality, CDMA system architectures typically utilize reverse link, i.e., mobile to base station, power control techniques by which the base station adaptively sets the transmit power of each mobile being served to the minimum level required to maintain adequate performance (usually assessed by comparing the ratio of energy per bit, $E_b$, to interference, $N_o$, at the base station with a target $E_b/N_o$ value). As interference at a network base station increases with increased reverse link load levels (hereinafter "load levels"), the base station issues mobile transmit power up-adjust commands as needed. At high load levels, the substantial interference which is likely to occur at the base station prompts the base station to issue an increased number of power up-adjust commands, particularly to those mobiles at outer cell/sector boundaries, thereby resulting in even greater interference at the base station. If not otherwise addressed, such increases in interference ultimately result in loss of base station coverage area (i.e., cell/sector shrinkage) because distant mobiles will not be able to transmit at the power level needed to achieve adequate call quality. Therefore, calls from such distant mobiles may be dropped under high load conditions.

To protect against such instability and loss of base station coverage area, CDMA networks commonly rely on call admission schemes, whereby mobiles in a heavily loaded cell/sector may be denied service from the corresponding base station. Assuming a static environment, the maximum number of users, $N_{max}$, that can be served in a CDMA cell/sector (i.e., a 100% load level) can be expressed as:

$$N_{max} = \frac{PG}{v\frac{E_b}{N_o}} \times \frac{1}{\beta}, \quad (1)$$

where PG is the processing gain of the CDMA system and is defined as the ratio of bandwidth used to the data rate achieved, v is the voice activity, and $\beta$ is the reuse efficiency of the CDMA cellular approach and is defined as the ratio of interference from other cells/sectors to interference within the cell/sector. When the cell/sector serves N users, the load level can be expressed as:

$$L = \frac{N}{N_{max}} = \frac{Nv\frac{Eb}{No}}{PG} \times \beta. \quad (2)$$

Measured $E_b/N_o$, voice activity v, and CDMA reuse efficiency $\beta$ are typically varying quantities, however. In particular, feasible approaches for accurately measuring $\beta$ are unknown, and, thus, the above expression cannot be used in practice to determine load levels.

One current approach calculates load levels as a function of the ratio of total receive power rise measured at the base station to background noise. More specifically, as set forth in R. Padovani, *Reverse Link Performance of IS-95 Based Cellular Systems*, IEEE Personal Communications, pp. 28–34, 1994, there is a direct relationship between load levels and the ratio of total received power at the base station to background noise, which may be expressed as:

$$L = 1 - \frac{1}{Z}, \quad (3)$$

where Z is the ratio of total receiver power to background noise. Background noise includes thermal noise as well as other non-CDMA interference such as jammer signal power. A drawback of this approach, however, is the difficulty of obtaining an accurate measure of background noise, and in particular thermal noise, in a dynamic network environment, and therefore accurate reverse link load level calculations utilizing the above expression cannot typically be realized.

SUMMARY OF THE INVENTION

The present invention is a system and a method for controlling call admission in a wireless communications network which estimates load levels as a function of changes in base station receive power and/or changes in the number of mobiles served in the cell/sector (hereinafter "number of users"). In one embodiment, the present invention is a call admission controller of a wireless network base station, such as a CDMA base station, which utilizes multiple load level estimating methods, whereby a first load level estimating method generates an initial load level estimate, and at least one additional estimating method recursively generates updated load level estimates as a function of changes in the number of users and/or changes in base station receive power.

In one implementation, a call admission controller receives initial and updated number of users and base station receive power measurements, and estimates load level, $L_{new}$, as:

$$L_{new}(N_{new}, P_{new}) = \frac{N_{new} \times (P_{new} - P_{old})}{N_{new} \times (P_{new} - P_{old}) + P_{old} \times (N_{new} - N_{old})}, \quad (4)$$

where $N_{new}$ and $N_{old}$ are integer values representing the current and previous number of users values respectively, and $P_{new}$ and $P_{old}$ are current and previous base station receive power measurements respectively.

Subsequently, the call admission controller recursively updates load level estimates as being linearly proportional to a change in the number of users by calculating:

$$L_{new} = L_{old} \times \frac{N_{new}}{N_{old}}, \quad (5)$$

where $L_{old}$ represents the previous load estimate. Recognizing that load level may not change in linear proportion to changes in the number of users under certain conditions, such as when significant changes in background noise or reverse link power from mobiles in nearby cells/sectors occur, the call admission controller verifies the load level previously estimated as a function of changes in the number of users by calculating an estimated base station receive power, $P_{new'}$, as a function of the estimated load level, in accordance with the expression:

$$P_{new} = \frac{P_{old}(1 - L_{old})}{(1 - L_{new})}, \quad (6)$$

and compares $P_{new'}$ with an actual base station receive power level. When $P_{new'}$ is not sufficiently close to measured base station receive power, the call admission controller uses a third load level estimating method, which recursively estimates load level as a function of changes in base station receive power, by calculating:

$$L_{new} = 1 - \frac{P_{old}}{P_{new}} \times (1 - L_{old}). \quad (7)$$

By estimating load levels as a function of changes in the number of users and/or base station receive power measurements, load estimation according to the present invention is not dependent on determining background noise. Furthermore, by recursively updating load level estimates using multiple techniques, estimate inaccuracies can be avoided.

BRIEF DESCRIPTION OF THE DRAWINGS

Other aspects and advantages of the present invention will become apparent upon reading the following detailed description, and upon reference to the drawings in which.

DETAILED DESCRIPTION

The present invention is a system and method for controlling call admission in a wireless communications network which estimates load levels as a function of changes in base station receive power and/or the number of users. In one embodiment, the present invention is a call admission controller of a wireless network base station, such as a CDMA base station, which utilizes a first load level estimating method to generate an initial load level estimate, and at least one additional load level estimating method to recursively update load level estimates as a function of changes in the number of users and/or base station receive power measurements. An illustrative embodiment of a system and method for controlling call admission in a wireless communications network according to the present invention is described below.

Figure 1:
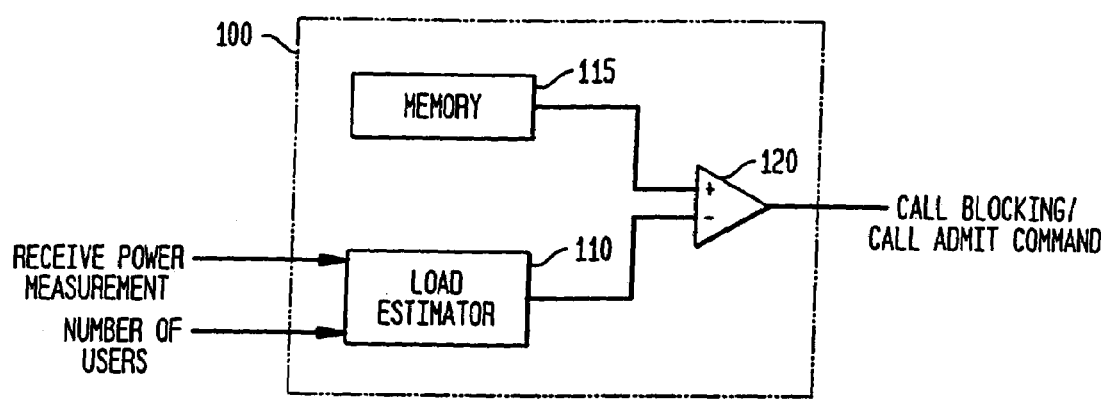
FIG. 1 illustrates select components of an exemplary call admission controller according to embodiments of the present invention.

Referring to FIG. 1, there is shown a call admission controller 100 which includes a load estimator 110, a memory unit 115, and a comparator 120. The load estimator 110 receives base station receive power values, e.g., from the base station power measurement circuitry (not shown), and also number of users values, e.g., from the base station call processing unit (not shown). The call admission controller 100 may be implemented as a routine of the base station call processing unit software, which denies a mobile's request to communicate with the base station under high load conditions. As discussed below, the load estimator 110 utilizes base station receive power measurements and number of user values to estimate load levels, and outputs the result to a first input of the comparator 120. As is well known in the art, base station receive power measurements may be represented by Received Signal Strength Index (RSSI) values which are typically collected at the network base station. The memory unit 115 stores a load level threshold, e.g., 0.7, which is received at the second input of the comparator 120. When the comparator 120 determines that the load level estimate received from the load estimator 110 exceeds the load level threshold received from the memory unit 115, the comparator 120 outputs a call blocking command signal which commands the base station call processing unit to block additional mobile requests to communicate with the base station. By outputting call blocking commands when load levels exceed a threshold, the call admission controller 100 prevents cell/sector overload conditions which may lead to the network instability and loss of cell/sector coverage area discussed above.

Figure 2:
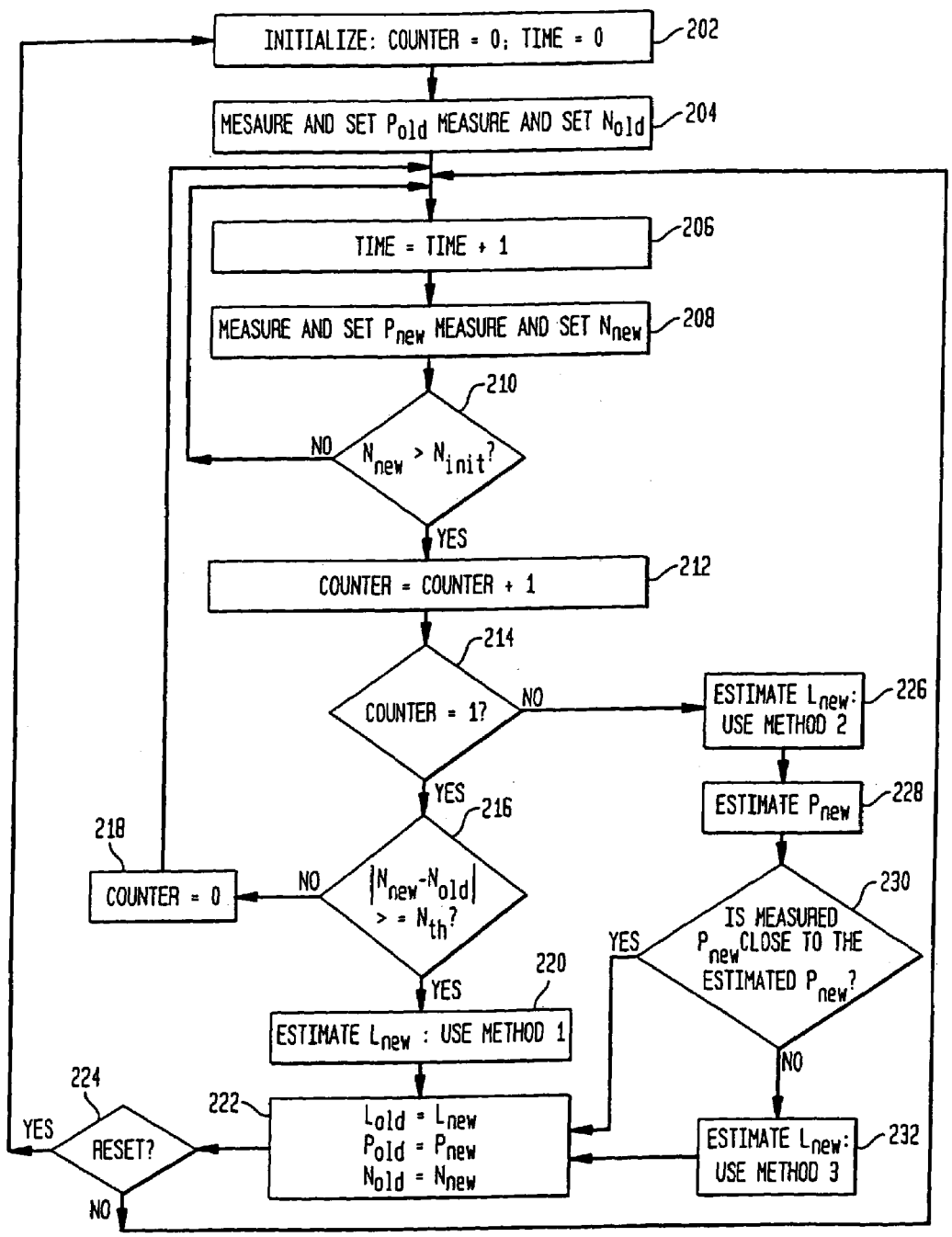
FIG. 2 is a flow diagram illustrating a load level estimating operation employed by the call admission controller according to embodiments of the present invention.

The operation of the load estimator 110 for estimating initial and updated load levels will next be described with reference to the flow diagram of FIG. 2. It should be realized the load estimator 110 may be realized as a computer implemented algorithm, or as programmable or dedicated logic circuitry, for performing the operations detailed below.

Initially, the load estimator 110 sets a counter index, counter, and a time index, time, to 0 (Step 202). Next, the load estimator 110 sets an initial base station receive power value, $P_{old}$, to a recently received base station received power measurement. In practice, $P_{old}$ may be set to a statistical average of multiple base station receive power measurement values taken over a sampling period, e.g., the mean of 100 RSSI samples, thereby enhancing accuracy. The base station receive power measurements are preferably in dBms, but also may be represented in Watts. In addition to setting an initial value for $P_{old}$, the load estimator 110 sets a number of users value, $N_{old}$, to a number of users value received from the base station's call processing unit (Step 204).

Next, the load estimator 110 increments time by 1 (Step 206), and obtains a new base station receive power measurement and number of users value, which are used to set $P_{new}$ and $N_{new}$ respectively (Step 208). It may be assumed that load level is low relative to the load level threshold when few mobiles are being served, and, thus, the load estimator does not attempt to estimate load until $N_{new}$ exceeds a certain level, $N_{init}$. The load estimator 110, thus, compares $N_{new}$ and $N_{init}$ (Step 210), and returns to Step 206, i.e., increments time by 1, when $N_{new}$ is not at least equal to $N_{init}$, and increments counter by 1 when $N_{new}$ is at least equal to $N_{init}$ (Step 212). After determining that $N_{new}$ exceeds $N_{init}$ at Step 210, and incrementing counter at Step 212, the load estimator 110 determines whether counter=1 (Step 214).

When counter=1, the load estimator 110 compares $|N_{new}-N_{old}|$ and a threshold value, $N_{th}$ (Step 216). When $|N_{new}-N_{old}|$ is not at least equal to $N_{th}$, the load estimator 110 resets counter to 0 (step 218), and returns to Step 206. When, on the other hand, $|N_{new}-N_{old}|$ is at least equal to $N_{th}$, the load estimator 110 estimates a load level, $L_{new}$, in accordance with a first estimating method (Step 220). By not calculating a load level estimate until $|N_{new}-N_{old}|$ at least equals $N_{th}$, e.g., $N_{th}$=3, more stable and accurate calculations are achieved.

According to one specific implementation of the present invention, the first estimating method determines $L_{new}$ as a function of changes in base station receive power measurements and changes in number of users values. Specifically, the load estimator 110 calculates:

$$L_{new}(N_{new}, P_{new}) = \frac{N_{new} \times (P_{new} - P_{old})}{N_{new} \times (P_{new} - P_{old}) + P_{old} \times (N_{new} - N_{old})}. \quad (4)$$

After an initial estimate of $L_{new}$, to enable subsequent recursive load level estimates, $L_{old}$ is set to equal $L_{new}$, $P_{old}$ is set to equal $P_{new}$, and $N_{old}$ is set to equal $N_{new}$, (Step 222). Next, the load estimator 110 determines whether a reset condition has occurred (Step 224), e.g., when a call processing software update is required, or as otherwise needed. When reset occurs, the load estimator 110 returns to the initialization Step 202. When no reset condition has occurred, the load estimator 110 returns to Step 206 to increment time by 1.

When counter≠1 at Step 214, the load estimator 110 estimates load level using a second estimating method (Step 226). The second load estimating method recognizes that changes in load level are typically linearly proportional to a changes in number of users values. Specifically, the second load level estimating method is expressed as:

$$L_{new} = L_{old} \times \frac{N_{new}}{N_{old}}. \quad (5)$$

To confirm that the second load level estimating method yields a reasonably accurate result, the load estimator 110 calculates an estimate of $P_{new}$, $P_{new'}$, using the $L_{new}$ value obtained from the second load level estimating method (Step 228). Specifically, the load estimator 110 calculates:

$$P_{new} = \frac{P_{old}(1 - L_{old})}{(1 - L_{new})}. \quad (6)$$

Next, the load estimator 110 compares $P_{new'}$ with an actual base station receive power measurement (Step 230). When $P_{new'}$ is reasonably close to the actual base station receive power measurement (e.g., +/−5%), the load estimator 110 outputs the result of the second load level estimating method to the comparator 120, and returns to Step 222. When $P_{new'}$ is not sufficiently close to the measured power value, the load estimator 110 utilizes a third load level estimating method to obtain $L_{new}$ (Step 232). The third load level estimating determines that load levels change as a function of a change is base station receive power measurements. Specifically, the load estimator 110 calculates:

$$L_{new} = 1 - \frac{P_{old}}{P_{new}} \times (1 - L_{old}). \quad (7)$$

The load estimator 110 outputs the result from the third load level estimating method to the comparator 120, and returns to Step 222 so that the load level may be recursively updated (e.g., updated every 2 seconds).

By using a plurality of recursive load level estimating methods, such as those described above, inaccuracies may be avoided. Furthermore, by recognizing differential relationships between load levels, base station receive power measurements, and the number of users, load levels are accurately estimated without relying on background noise measurements.

It should be apparent to those skilled in the art that various modifications and applications of this invention are contemplated which may be realized without departing from the spirit and scope of the present invention.

What is claimed is:

1. A method of controlling call admission in a communications network, comprising:
   calculating a load level as a function of at least one of a difference between a current measured power and a previous measured power and a difference between a current number of users and a previous number of users; and
   controlling call admission based on the calculated load level, wherein said calculating step recursively calculates updated load levels.

2. A method of controlling call admission in a communications network, comprising:
   calculating a load level as a function of at least one of a difference between measured powers over time and a difference between a number of users over time; and
   controlling call admission based on the calculated load level, wherein said calculating step estimates load level as a function of a measured difference between powers over time and a difference between the number of users over time.

3. The method of claim 2, wherein said calculating step estimates load level, $L_{new}$, by solving:

$$L_{new}(N_{new}, P_{new}) = \frac{N_{new} \times (P_{new} - P_{old})}{N_{new} \times (P_{new} - P_{old}) + P_{old} \times (N_{new} - N_{old})},$$

where $N_{new}$ and $N_{old}$ are current and previous number of users values respectively, and $P_{new}$ and $P_{old}$ are current and previous power measurements respectively.

4. A method of controlling call admission in a communications network, comprising:
   calculating a load level as a function of at least one of previous and current measured powers and previous and current number of users; and
   controlling call admission based on the calculated load level,
   wherein said calculating step recursively updates the calculated load level as a function of previous and current number of users.

5. The method of claim 4, wherein said calculating step recursively updates the calculated load level, $L_{new}$, by solving:

$$L_{new} = L_{old} \times \frac{N_{new}}{N_{old}},$$

where $L_{old}$ is a previously calculated load level, and $N_{new}$ and $N_{old}$ are current and previous number of users values respectively.

6. A method of controlling call admission in a communications network, comprising:

calculating a load level as a function of at least one of measured powers and previous and current number of users; and controlling call admission based on the calculated load level, wherein said calculating step recursively updates the calculated load level as a function of previous and current measured powers.

7. The method of claim 6, wherein said calculating step recursively updates the calculated load level, $L_{new}$, by solving:

$$L_{new} = 1 - \frac{P_{old}}{P_{new}} \times (1 - L_{old}),$$

where $L_{old}$ is a previously calculated load level, and $P_{new}$ and $P_{old}$ are current and previous power measurements respectively.

8. The method of claim 6, further comprising:

verifying the calculated load level before using the calculated load level in said controlling step.

9. The method of claim 8, wherein said verifying step calculates an estimated power measurement, $P_{new'}$, based on the calculated load level, $L_{new}$, by solving:

$$P'_{new} = \frac{P_{old}(1 - L_{old})}{(1 - L_{new})},$$

where $P_{old}$ is a previous power measurement and $L_{old}$ is a previously calculated load level, said verifying step comparing $P_{new'}$ with an actual power measurement, $P_{new}$, to determine whether $L_{new}$ is reasonably accurate.

10. The method of claim 9, wherein, when said verifying step indicates that the $P_{new'}$ is not sufficiently close to $P_{new}$, said calculating step recursively updates the calculated load level, $L_{new}$ by solving:

$$L_{new} = 1 - \frac{P_{old}}{P_{new}} \times (1 - L_{old}).$$

11. A system of controlling call admissions in a communications network, comprising:

load calculating means for calculating a load level as a function of at least one of previous and current measured powers and previous and current number of users; and control means for controlling call admission based on the calculated load level, wherein said load calculating means recursively updates the calculated load levels.

12. The system of claim 11, further comprising:

input means for receiving power measurements and number of user values.

13. A system of controlling call admissions in a communications network, comprising:

load calculating means for calculating a load level as a function of at least one of a difference between measured powers over time and a difference between a number of users over time; and control means for controlling call admission based on a load level the calculated load level, wherein said load calculating means estimates load level as a function of a difference between measured powers over time and a difference between the number of users over time.

14. The system of claim 13, wherein said load calculating means estimates load level, $L_{new}$, by solving:

$$L_{new}(N_{new}, P_{new}) = \frac{N_{new} \times (P_{new} - P_{old})}{N_{new} \times (P_{new} - P_{old}) + P_{old} \times (N_{new} - N_{old})},$$

where $N_{new}$ and $N_{old}$ are the current and previous number of users values respectively, and $P_{new}$ and $P_{old}$ are the current and previous power measurements respectively.

15. A system of controlling call admissions in a communications network, comprising:

load calculating means for calculating a load level as a function of at least one of previous and current measured powers and previous and current number of users; and control means for controlling call admission based on the calculated load level, wherein said load calculating means recursively updates the calculated load level as a function of previous and current number of users.

16. The system of claim 15, wherein said load calculating means recursively updates the calculated load level, $L_{new}$, by solving:

$$L_{new} = L_{old} \times \frac{N_{new}}{N_{old}},$$

where $L_{old}$ is a previously calculated load level, and $N_{new}$ and $N_{old}$ are current and previous number of users values respectively.

17. A system of controlling call admissions in a communications network, comprising:

load calculating means for calculating a load level as a function of previous and current measured powers and previous and current number of users; and control means for controlling call admission based on the calculated load level, wherein said load calculating means recursively updates the calculated load level as a function of previous and current measured powers.

18. The system of claim 17, wherein said load calculating means recursively updates the calculated load level, $L_{new}$, by solving:

$$L_{new} = 1 - \frac{P_{old}}{P_{new}} \times (1 - L_{old}),$$

where $L_{old}$ is a previously calculated load level, and $P_{new}$ and $P_{old}$ are current and previous received power measurements respectively.

19. The system of claim 17, further comprising:
verifying means for verifying the calculated load level before said control means uses the calculated load level.

20. The system of claim 19, wherein said verifying means calculates an estimated power measurement, $P_{new'}$, based on the calculated load level, $L_{new}$, by solving:

$$P'_{new} = \frac{P_{old}(1 - L_{old})}{(1 - L_{new})},$$

where $P_{old}$ is a previous power measurement and $L_{old}$ is a previously calculated load level, said verifying means comparing $P_{new'}$ with an actual power measurement $P_{new}$ to determine whether $L_{new}$ is reasonably accurate.

21. The system of claim 20, wherein, when said verifying means indicates that the $P_{new'}$ is not sufficiently close to $P_{new}$, said calculating means recursively updates the calculated load level $L_{new}$ by solving:

$$L_{new} = 1 - \frac{P_{old}}{P_{new}} \times (1 - L_{old}).$$

* * * * *